April 9, 1940.    P. RENFREW    2,196,669
FLUID METER
Filed Feb. 7, 1938    7 Sheets-Sheet 2

INVENTOR.
PAUL RENFREW
BY Oscar A. Mellin
ATTORNEY.

April 9, 1940.  P. RENFREW  2,196,669
FLUID METER
Filed Feb. 7, 1938   7 Sheets-Sheet 3
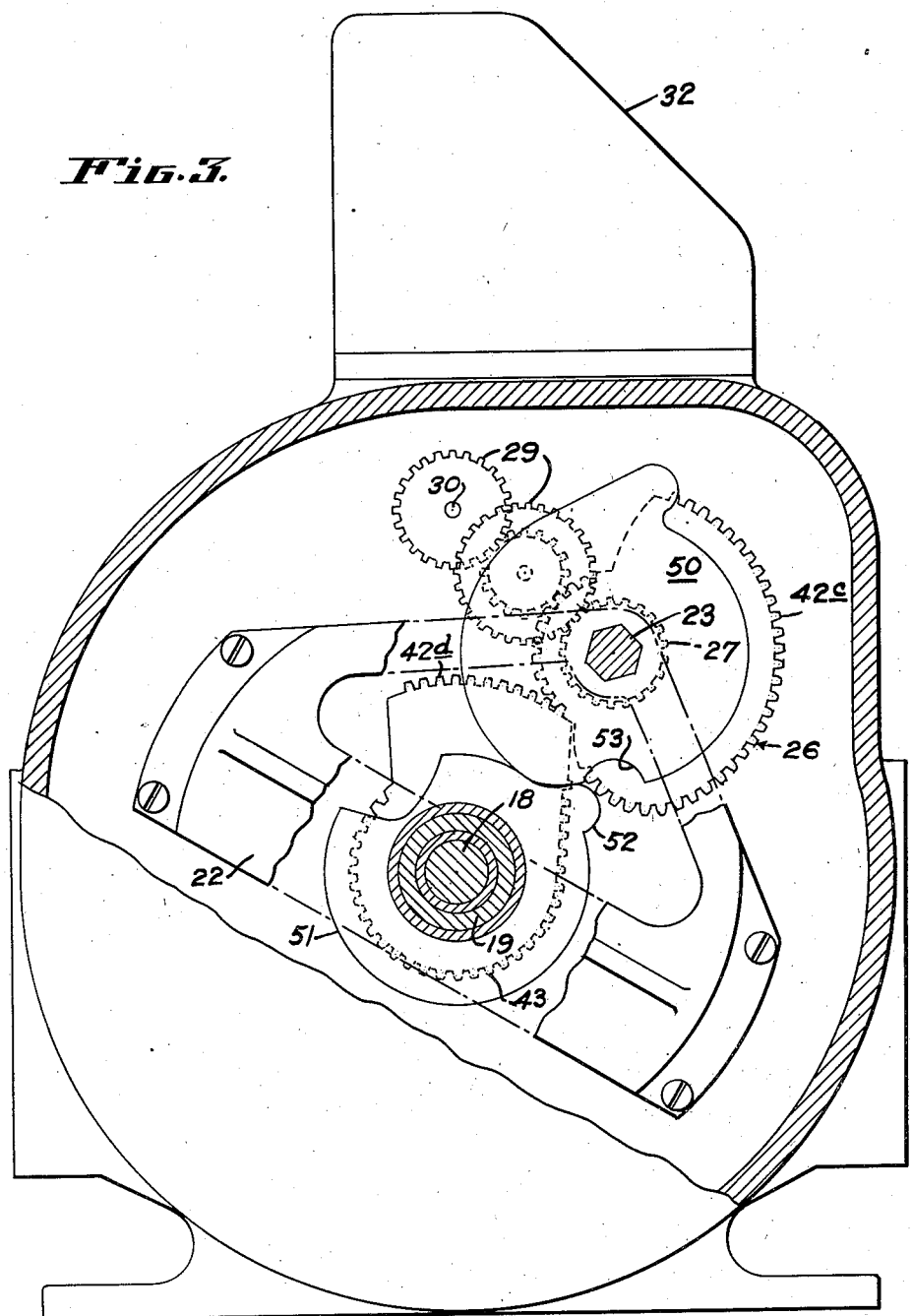
INVENTOR.
PAUL RENFREW
BY Oscar A. Mellin
ATTORNEY.

April 9, 1940.　　　P. RENFREW　　　2,196,669
FLUID METER
Filed Feb. 7, 1938　　　7 Sheets-Sheet 4
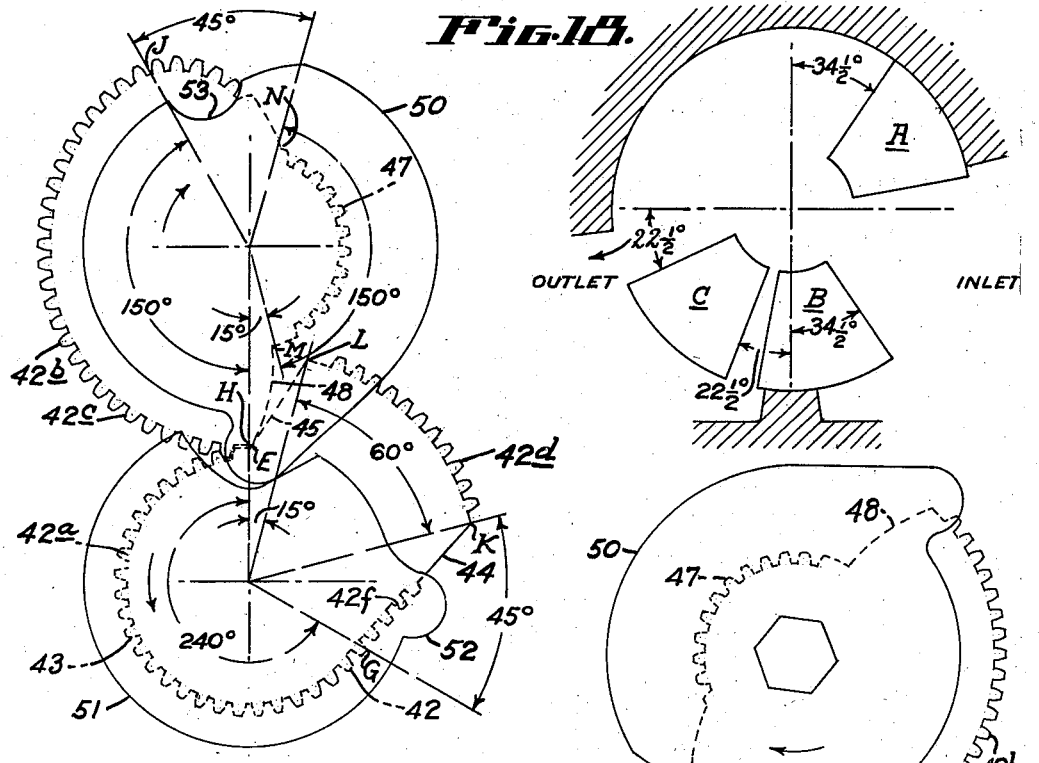
Fig.18.
Fig.4.
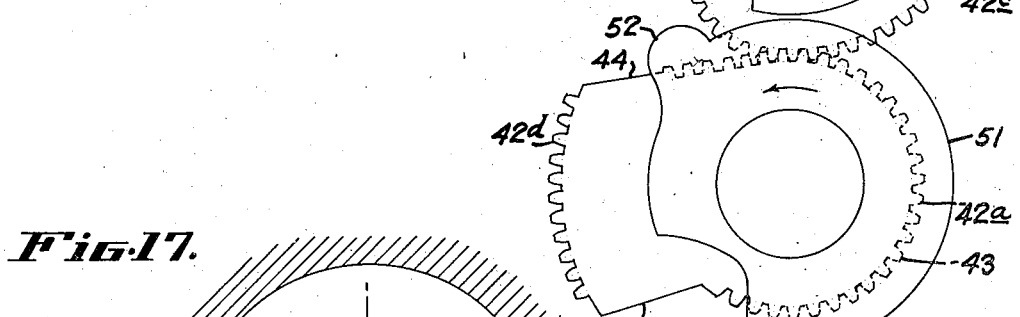
Fig.4a.
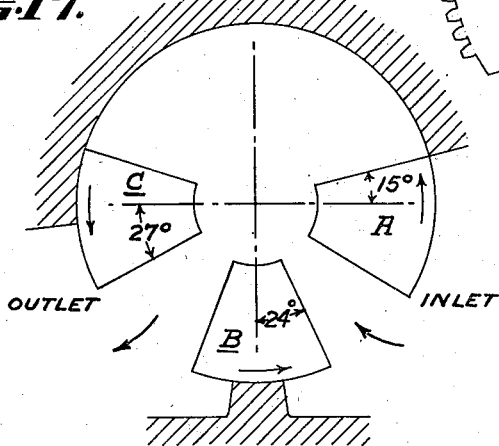
Fig.17.
INVENTOR.
PAUL RENFREW
BY
Oscar A. Mellin
ATTORNEY.

April 9, 1940.   P. RENFREW   2,196,669
FLUID METER
Filed Feb. 7, 1938   7 Sheets-Sheet 5

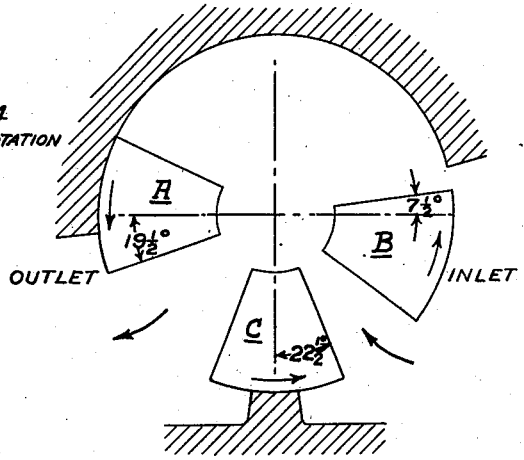

Fig. 6.
A HAS ROTATED 72° AT SPEED OF 4 TO 1
B HAS ROTATED 45° GRADUALLY AC-
  CELLERATED SPEED
C HAS ROTATED 18° AT 1 TO 4 SPEED

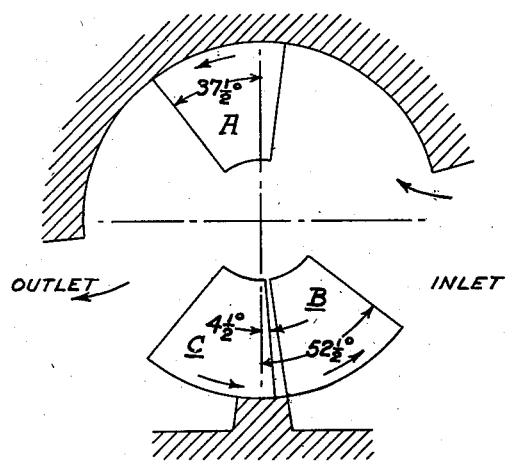

Fig. 5.
A ROTATING AT SPEED OF 4 TO 1
B HAS COMPLETED ITS 60° ROTATION AT 1 TO 4
  JUST STARTING ITS ACCELERATED ROTATION
C ROTATING AT SPEED OF 1 TO 4

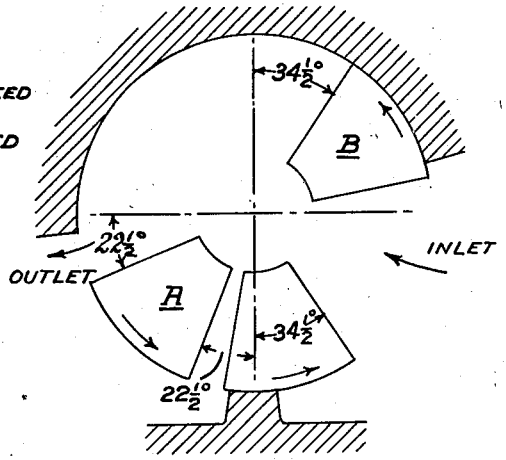

Fig. 8.
A AND B HAVE ROTATED 40½° AT 4 TO 1 SPEED
A NOW READY TO START 15° GRADUAL
  DECELERATION
C HAS ROTATED 10°+ AT 1 TO 4 SPEED

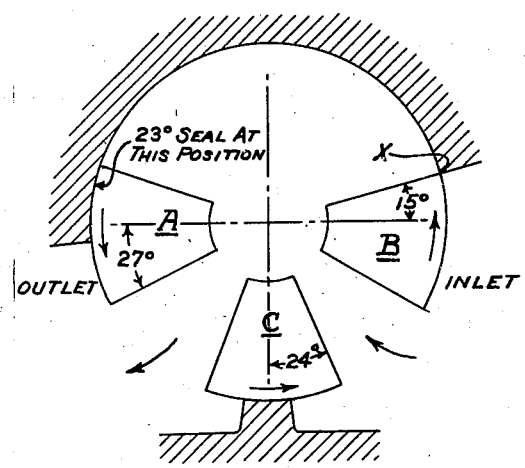

Fig. 7.
A AND B HAVE ROTATED 7½° AT 4 TO 1 SPEED
B HAS ROTATED TO SEAL AT POINT X
C HAS ROTATED ABOUT 2° AT 1 TO 4 SPEED

INVENTOR.
PAUL RENFREW
BY Oscar A. Mellin
ATTORNEY.

April 9, 1940.                P. RENFREW                2,196,669
                                FLUID METER
                            Filed Feb. 7, 1938          7 Sheets-Sheet 6

Fig. 10.
A AND C HAVE ROTATED 12° AT 1 TO 4 SPEED
C HAS JUST COMPLETED 60° ROTATION AT
 1 TO 4 READY TO BEGIN ITS 45° ACCELERATION
B HAS ROTATED 48° AT 4 TO 1

Fig. 9.
A HAS COMPLETED 15° OF DECELERATED ROTATION
B HAS ROTATED 24° AT 4 TO 1 SPEED
C HAS ROTATED 6° AT 1 TO 4 SPEED

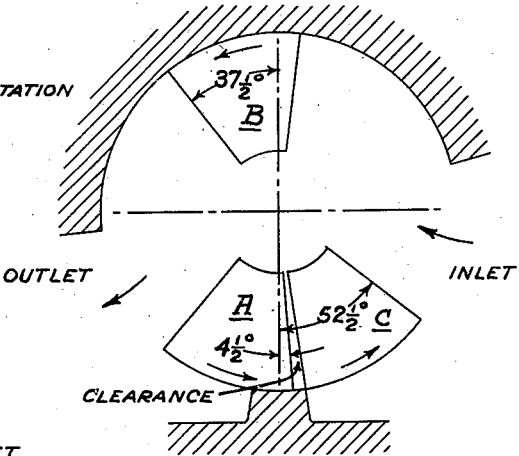

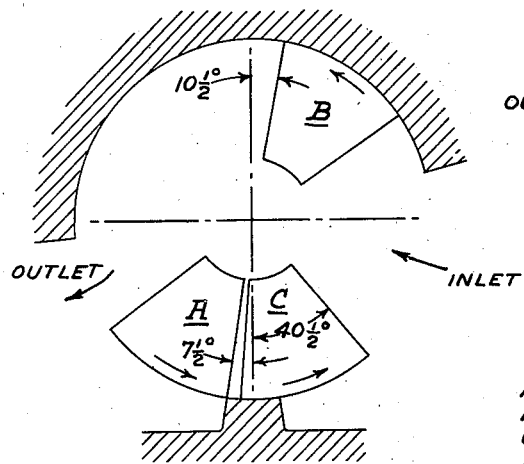

Fig. 12.
A HAS ROTATED ABOUT 2° AT 1 TO 4 SPEED
B AND C HAVE ROTATED 7½° AT 4 TO 1 SPEED
C ROTATED TO SEAL AT POINT X
B STILL HAS ABOUT 23° OF SEAL

Fig. 11.
A HAS ROTATED 18° AT 1 TO 4 SPEED
B HAS ROTATED 72° AT 4 TO 1 SPEED
C HAS JUST COMPLETED ITS 45°
  OF ACCELERATED ROTATION

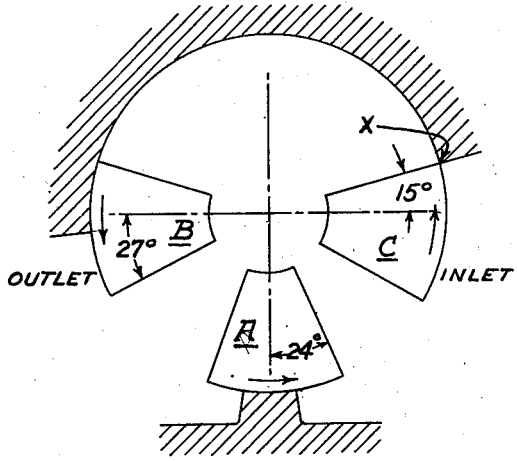

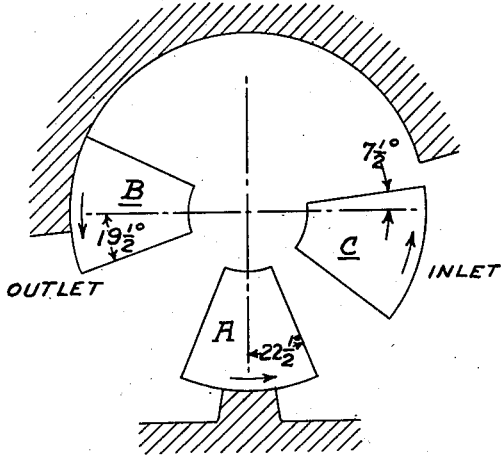

INVENTOR.
PAUL RENFREW
BY   Oscar A. Mellin
              ATTORNEY.

April 9, 1940.   P. RENFREW   2,196,669
FLUID METER
Filed Feb. 7, 1938   7 Sheets-Sheet 7

Fig.14.
A Has Rotated 6° At 1 To 4
B Has Just Completed 15° Deceleration
C Has Rotated 24° At 4 To 1
B Ready To Enter 60° Rotation At 1 To 4

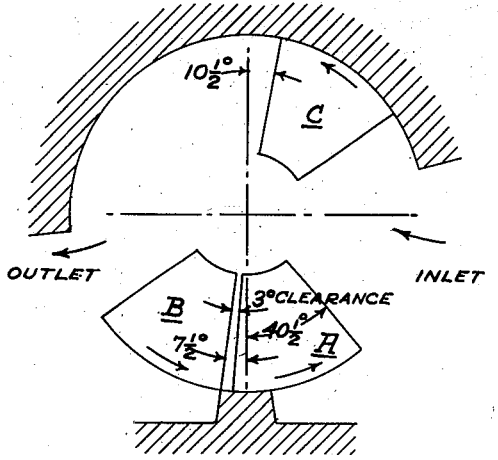

Fig.13.
A Has Rotated 10½° At 1 To 4 Speed
B And C Have Rotated 40½° At 4 To 1
B Ready To Start 15° Deceleration

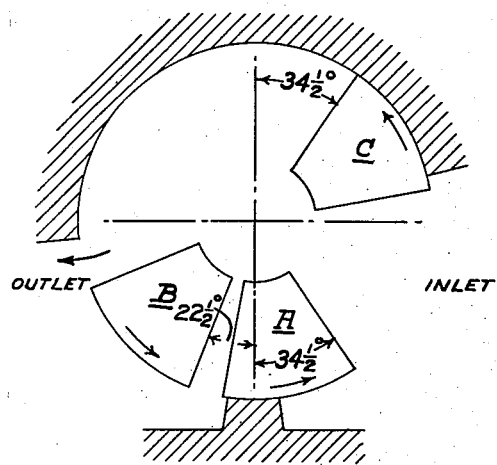

Fig.16.
A Has Just Completed 45° Acceleration
Ready To Start 4 To 1 Speed
B Has Rotated 18° At 1 To 4
C Has Rotated 72° At 4 To 1

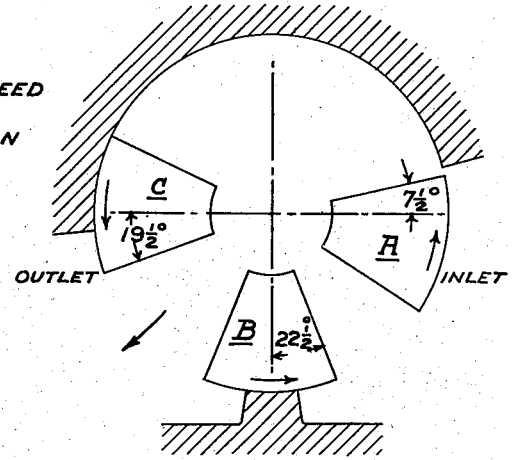

Fig.15.
A And B Have Rotated 12° At 1 To 4 Speed
C Has Rotated 48° At 4 To 1
A Ready To Start 45° Acceleration

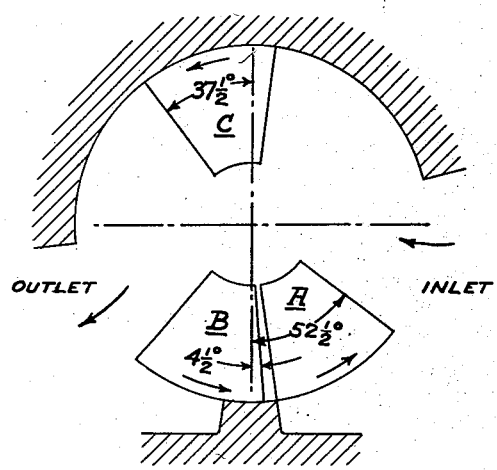

INVENTOR.
PAUL RENFREW
BY Oscar A. Mellin,
ATTORNEY.

Patented Apr. 9, 1940

2,196,669

UNITED STATES PATENT OFFICE 2,196,669

FLUID METER

Paul Renfrew, Berkeley, Calif., assignor to Ralph M. Brodie Company, Oakland, Calif., a corporation of California Application February 7, 1938, Serial No. 189,161

8 Claims. (Cl. 73—260)

This invention relates to fluid meters of the displacement type.

It is the principal object of my present invention to provide a generally improved fluid meter of the rotary displacement type, which meter having a large displacement relative to its size and which will operate with a minimum of energy consumption resulting in a minimum of pressure drop and maximum accuracy.

In practicing my invention, I provide a meter casing having an annular metering chamber having spaced inlet and outlet ports. Fitting within the metering chamber are a plurality of vanes revolving about the axis of said metering chamber. These vanes are operatively interconnected and travel through the same definite cycle of operation at differently timed intervals due to the interconnection between them. The cycle of each vane consists of one complete traverse through the metering chamber through different stages of relatively different speeds. The pressure of the fluid entering the inlet port operates the vanes so that a definite quantity of fluid is displaced and discharged through the outlet port during each complete cycle of each vane.

One form which the invention may assume is exemplified in the following description and illustrated by way of example in the accompanying drawings, in which:

Fig. 3 is a view in end elevation of the drive end of the meter with the cover plate removed and portions of the bearing bracket broken away to more clearly disclose the entire interdrive connection between the vanes.

Fig. 4 is an enlarged view of the drive gearing and cams for one vane, showing the angular spacing between the different stations.

Fig. 4a is the same as Fig. 4 but showing the gears in the position they would assume if the vane gear were relatively fixed to the vane C with the vane in the position shown in Fig. 12.

Figure 1:
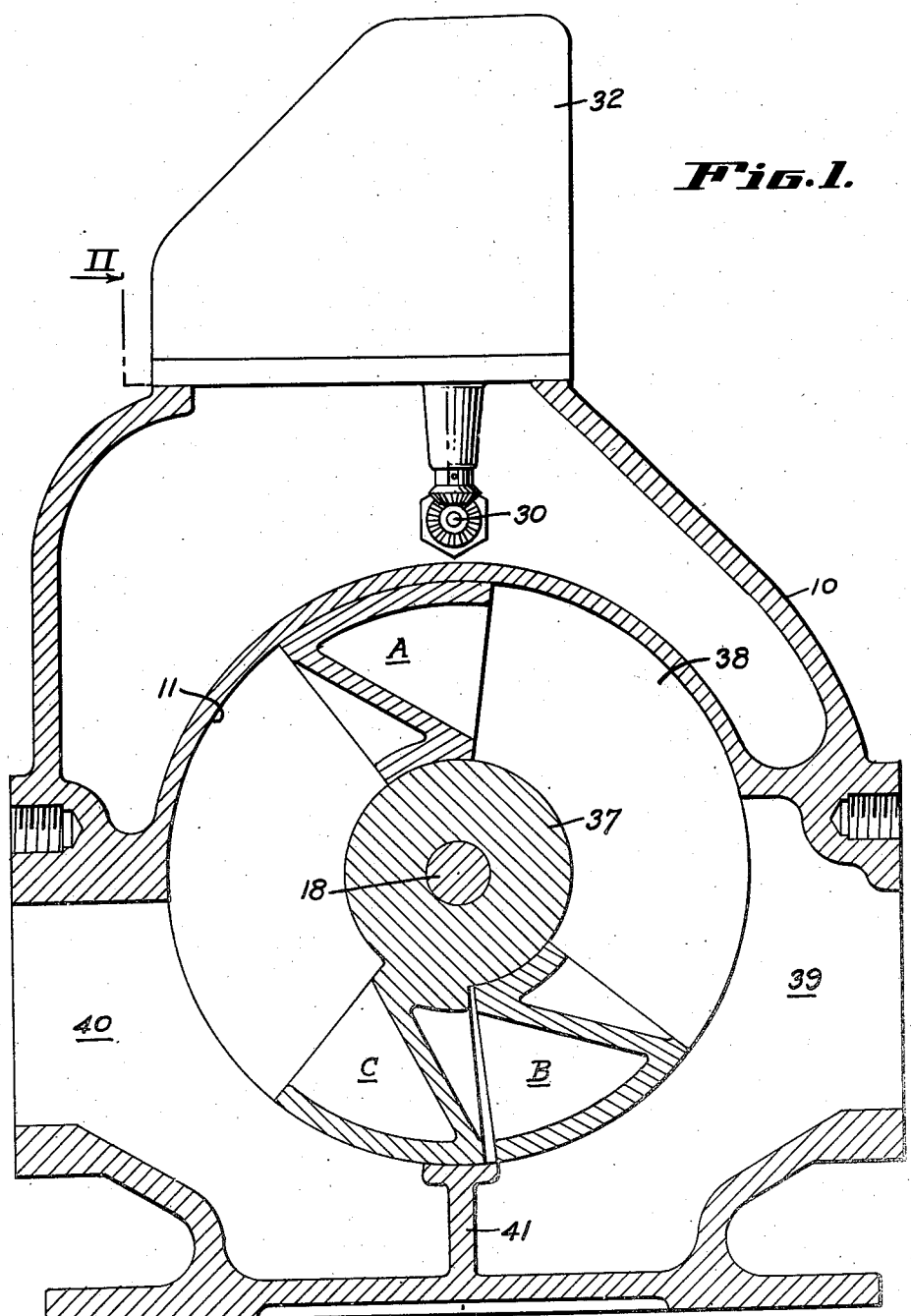
Fig. 1 is a central longitudinal section taken through a meter embodying the preferred form of my invention.

Figs. 5 to 18, inclusive, are diagrammatic illustrations showing the complete cycle of one vane and showing the various positions the vanes assume relative to each other during the cycle of operation of one vane.

Referring more particularly to the accompanying drawings, 10 indicates a meter casing having a straight cylindrical bore 11 extending longitudinally therethrough from end to end. Surrounding the ends of the bore 11 are annular flanges 12. Arranged over one end of the cylinder and secured to the flanges 12 is a fixed head member 14, and over the opposite end of the cylinder is a fixed head member 15 also secured to the flanges 12. Concentrically with respect to the cylinder bore 11 the head members 14 and 15 are fitted with bearings 16 and 17 which are in absolute axial alignment.

Figure 2:
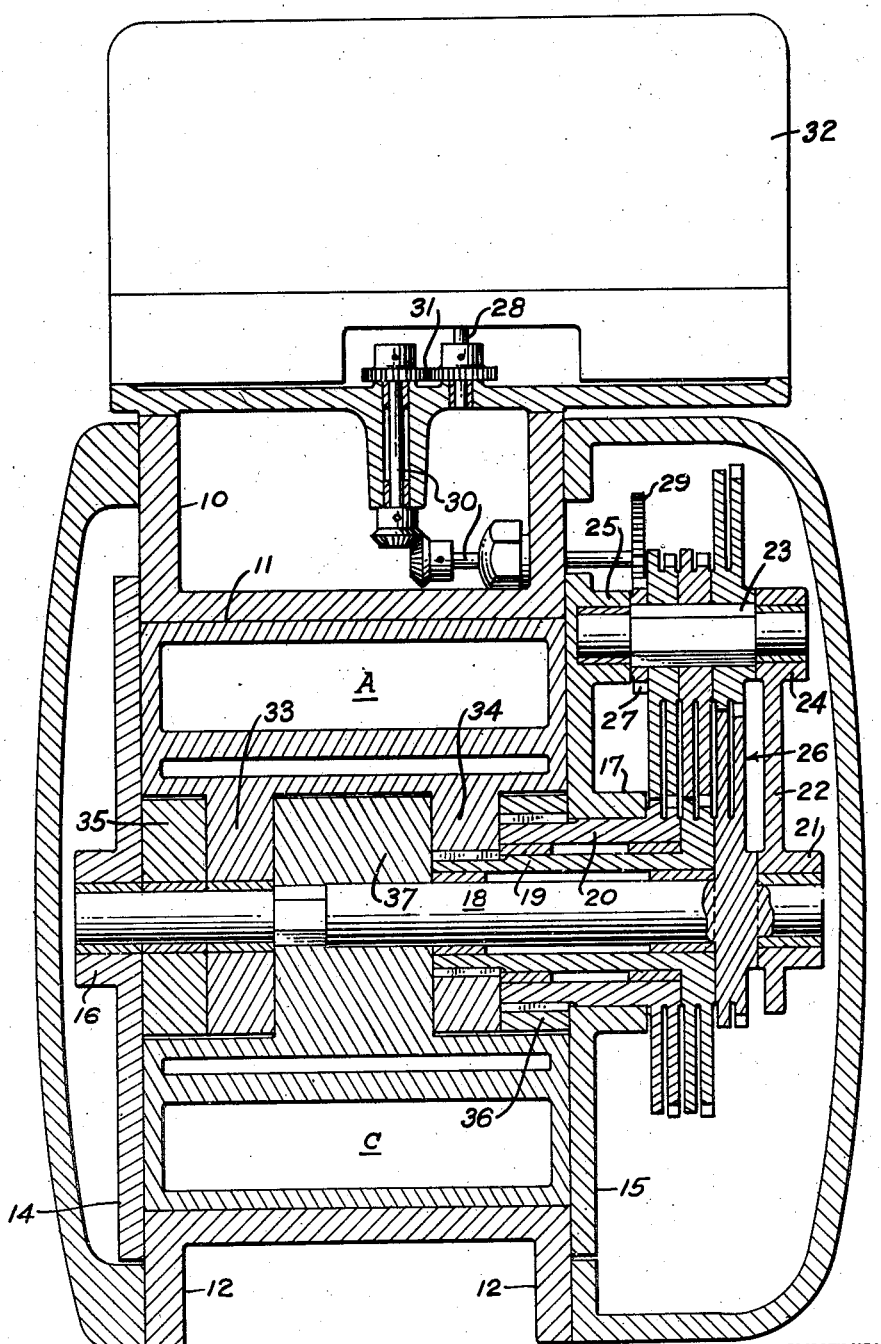
Fig. 2 is a transverse section through the meter taken on line II—II of Fig. 1.

Journalled in the bearings 16 and 17 are three telescopically arranged vane shafts 18, 19 and 20. At one end the innermost shaft 18 is journalled in the bearing 16, while at its opposite end it is journalled in a bearing 21 carried by a bracket plate 22 secured as illustrated in Figs. 2 and 3 to the head member 15. The shaft 20, which is the outermost one of the three, is journalled in the bearing 17 of the head member 15, while the shaft member 19 is journalled on the innermost shaft 18 in running contact with the bore of the outermost shaft 20.

At a spaced distance from the shaft 18 and with its axis parallel thereto is a jack shaft 23 which is hexagon in cross section. The ends of this shaft are turned round and are journalled at one end in a bearing 24 carried by the bracket plate 22 and at its opposite end in a bearing 25 formed by the head member 15.

Carried by the three telescopic shafts 18, 19 and 20 and by the jack shaft 23 are sets of gears and cams generally indicated in Fig. 2 by the numeral 26, which operate during the operation of the meter as will be hereinafter described to drive the jack shaft 23 at a constant rotative speed at any given inlet pressure.

In order to indicate the volume of fluid measured by the meter, the jack shaft 23 is provided with a spur gear 27 which drives a counter drive shaft 28 through the medium of a gear train 29, two intermediate shafts 30 provided with intermeshing bevel gears, and a pair of spur gears 31. The counterdrive shaft 28 drives a counter indicated by the numeral 32, which is conventional in design and construction, and for that reason it is not further illustrated.

It should be stated that the telescopically arranged shafts 18, 19 and 20 are independently rotatable and to each is fixed a vane. In this instance I have illustrated three vanes A, B and C. The vane A has two hubs 33 and 34 which are spaced apart longitudinally of the shafts 18, 19 and 20, the hub 34 being keyed or otherwise secured to the intermediate shaft 19. The other hub 33 is rotatably supported on the shaft 18. The vane B likewise has two spaced hubs of similar diameter and indicated by the numerals 35 and 36 in Fig. 2, the hub 36 being keyed or otherwise secured on the outer shaft 20, while the hub 35 is rotatably supported on the shaft 18. The vane C is provided with a center hub 37 which is secured on the shaft 18 either by means of keying or other suitable means as illustrated.

It is seen that the various hubs of the three vanes nest end to end and provide a comparatively solid cylindrical core coaxially of the cylinder 11 from end to end thereof, thereby forming an annular metering chamber 38 between the exterior of the hubs and the outer perimeter of the cylinder bore 11. It will also be noticed that the vanes A, B and C each extend the full radial dimension of this metering chamber and contact not only at their outer peripheral edge with the periphery of the chamber, but bear on their inner peripheral edge on the periphery of the adjacent hubs of the other vanes, so that each vane forms a moving partition in the metering chamber 38 with the end of the vanes slidably engaging the inner surfaces of the head members 14 and 15 at opposite ends of the metering chamber. The fits between the ends and outer and inner peripheral edges of the vanes and the walls of the metering chamber are substantially fluid tight under the differential pressures to which a meter of this type is subjected.

As illustrated in Fig. 1, it will be noticed that the outer peripheral edge of each vane is substantially wide. In the present instance I have shown each vane as having a peripheral edge of a width of 45 degrees, although I do not limit myself to this dimension.

At one side of the meter casing the same is formed with an inlet port 39 which extends through the wall of the metering chamber commencing at a point 7½ degrees from the vertical center line and extending to a point approximately 15 degrees above the horizontal center line. The sides of the port 39, however, are short of the ends of the metering chamber so that the ends of the vanes will bear on the arcuate surfaces at opposite sides of the ports as they traverse the same.

At the opposite side of the metering casing is formed an outlet port 40 which commences at a point 7½ degrees short of the vertical center line and extends to within 5 degrees of the horizontal center line. In width this port is similar to that 39 as just described.

The cylindrical wall of the metering chamber between the ports is 15 degrees long, extending 7½ degrees upon opposite sides of the vertical center line forming a sealing surface between the two ports. A fixed radial partition 41 is formed between said wall of the metering chamber and the outer wall of the casing so as to prevent communication between the inlet and outlet ports. It is obvious, of course, that both the inlet and outlet ports are surrounded by suitable flanges so that the meter may be interposed in a pipe line so that the fluid passing through the pipe line will enter the meter through the inlet port and discharge through the meter at the outlet port.

As previously stated, each vane is provided with a gear fixed to its shaft and a gear fixed to the jack shaft, and with a cam fixed to its shaft and a cam fixed to the jack shaft. These sets of gears and cams for each vane are identical in construction and formation and relative setting, although the sets of gears and cams on the jack shaft for each vane are progressively mounted 120 degrees apart.

For the purpose of this description, it is believed sufficient to describe the formation of one set of gears. Reference being had to Fig. 4, it will be seen that the vane gear 42 is formed with a concentric gear face 42a extending throughout 240 degrees from a point E to a point G which meshes with a concentric gear face 42b on its companion gear 42c on the jack shaft 150 degrees from the point H to the point J. In the present instance I have shown the concentric gear face 42b between H and J on the jack shaft gear as being $3\frac{7}{10}$ inches pitch diameter, while the concentric gear face 42a from E to G on the vane gear 42 is of 2 inches pitch diameter, it being understood that the pitch diameters which I am now giving are merely for the purpose of example and to show the relationship between the two and I do not confine myself to these exact dimensions.

Also on the vane gear 42 is a concentric gear face 42d of greater pitch diameter, two-wit, 3.714 inches pitch diameter, which commences at a point 45 degrees from the point G, or at the point K, and extends for an angle of 60 degrees to the point L, which is 15 degrees short of the point E. Between the point G and the point K is a series of teeth 42f formed on a pitch line which is tangential to the pitch line of the concentric gear face 42a between the points E and G. Slightly less than half way between the points G and K on this tangential line and continuing on the pitch line of the teeth to the point K, is a flat surface 44. Between the point E and L and extending through the arc of 15 degrees between the same and commencing at the point E at the outer diameter of the toothed surface 43 is a substantially flat surface 45.

To mesh with the concentric gear face 42d of the larger radius of the vane gear 42 is a concentric gear face 47 on the jack shaft gear which commences at a point M 15 degrees from the point H and extends 150 degrees to the point N, the same being of a pitch diameter of 1.486 inches. Between the point H and the point M is a curved cam face 48.

The length of the face 45 on the vane gear and the length of the face 48 on the jack shaft gear are exactly the same so that there will be no sliding contact between the two. The same is true of the length of the line G to K on the vane gear 42 as the line from N to J on the jack shaft gear which develops in a curved form with gear teeth to mesh with the gear teeth 42f between the points G and K. The purpose of the equality of length of these faces is, as previously described, to prevent sliding contact between the two.

It should be stated that each vane gear 42 is a driver for 192 degrees only, and during the remainder of its cycle of operation is driven by its jack shaft gear, which in turn is driven by one of the other vanes, which during that period constitutes the driver.

For illustration purposes I refer to Fig. 12 which shows the vane C just commencing its driving position. This vane will continue its driving until it has reached the position that the vane B is shown in Fig. 12, at which time it will discontinue driving and become driven.

Referring to Fig. 4a and to Fig. 12 and assuming that the vane gear 42 shown in Fig. 4a is fixed to the vane C of Fig. 12, in this position it will be seen that inasmuch as the fluid pressure will be against the vane C, driving the same, that the gear face 42a of the vane gear 42 will be in mesh with the gear face 42b of its jack shaft gear and will be driving the latter, and will continue to drive the jack shaft gear 42c until the vane gear 42 has traversed 192 degrees of rotation, at which time, referring to Fig. 12, the vane A will be in the position that vane C is illustrated in Fig. 12, and then will commence to drive the jack shaft through its set of gears. However, the gear faces 42a and 42b will still be in mesh so that the vane C and its vane gear will travel at a constant speed until the gears reach the position shown in Fig. 4. At this time the vane C will be in the position shown in Fig. 18 and just commencing 15 degrees of deceleration. However, to keep the gears in mesh and to move them through this angle of 15 degrees of deceleration, I have provided the cams as shown in Fig. 4.

It is seen that the high point of the cam 50 on the jack shaft will mesh with a depression in the cam 51 relatively fixed to the vane gear 42 and will drive the vane gear at a speed that there will be no sliding contact between the faces 45 and 48. The curved contactual faces between the two cams are so generated that the face 45 will roll upon the face 48, and in doing so reduce the rotative speed of the vane C and vane gear 42.

During this 15 degrees of movement the vane C will move from the position shown in Fig. 18 to the position of vane A shown in Fig. 9. Thereafter the toothed face 42d of the vane gear 42 will mesh with the toothed face 47 of the jack shaft gear and be driven thereby at a reduced rate of speed until the vane C reaches the position shown in Fig. 10.

When the vane C reaches the position shown in Fig. 10, the point K will be substantially at the point N and from this point N to the point J on the jack shaft gear the latter will roll on the tangential surface 44 and the toothed portion of the vane gear between the points K and G, thereby accelerating the speed of the vane gear 42 and its vane C until the latter reaches the position shown in Fig. 11.

To insure maintaining the gears in their correct relative positions, during this period, the high point 52 of the cam 51 is in mesh with a depression 53 in the cam 50, although this engagement does no work other than maintaining the gears in correct operative relationship.

When the point G registers with the point J, the vane gear 42 will be up to its highest relative speed and will be driven only until it reaches the point shown in Fig. 12, at which time the fluid pressure is exerted on the vane C and it becomes the driver as previously described, I having just described one complete cycle of one of the vanes.

From the foregoing it is apparent that there is an interconnecting drive between the vanes which causes each vane to travel through a cycle composed of four stages of relatively definite different speeds. Assuming that the vanes are in the position shown in Fig. 7, I will describe the four stages of the cycle as follows: B is just commencing the metering stage of the cycle and thereafter travels at a constant speed until its rear edge in respect to its direction of travel passes beyond the rear edge of the adjacent boundary of the outlet port as illustrated in Fig. 13. At this point the metering stage has terminated and the deceleration stage commences, and the speed of the vane B relative to its speed during the metering stage will decelerate until the forward edge of the vane B reaches the other boundary of the outlet port as shown in Fig. 14, at which point it will have reached the stage of lowest constant speed. From this point the vane B will commence its lowest constant speed stage, which is approximately one-fourth the speed at which it travels during the metering stage, and will continue this until it reaches the point where its nether edge reaches the adjacent boundary of the inlet port. At that point it has completed its constant lowest speed stage and enters into the fourth stage which is the acceleration stage, which increases the speed of the vane from its lowest speed to the speed which it travels through the metering stage. The end of the accelerating stage is when the vane B assumes the position which it is shown in Fig. 6, which is just prior to its forward edge registering with the succeeding terminus of the inlet port.

Likewise, as previously pointed out, the interconnecting drive means previously described between the vanes causes the metering stages of two of the vanes to overlap during their metering stages. At this time the arcuate distance between these two vanes, assuming that one is just entering the metering stage, is somewhat less than the arcuate distance between the inlet and outlet ports in the direction of rotation of the vanes. Therefore it is seen that these two vanes will travel at the same speed until the advanced vane uncovers the outlet port a substantial amount. Due to the fact that there will be no relative movement between the two vanes at this time, no slippage will occur and there will be no tendency to either compress or expand the fluid.

I also wish to point out that the interconnecting drive means between the vanes is such that there is at no time any relative movement between two vanes except when either the inlet or outlet ports is in communication with the space between the vanes. This, of course, eliminates slippage and renders the meter absolutely accurate and reduces pressure drop to a minimum.

I also want to point out that the seal between the inlet and outlet chambers is always maintained by at least one vane over a substantial area as illustrated in the diagrammatic drawings, Figs. 5 to 18, inclusive.

In the present instance the gear ratio is worked out so that the constant speed of the vane during its metering stage of its cycle is four times the speed of the vane during its constant speed during its lowest speed stage, and that the stage of deceleration more or less progressively decelerates the speed from the constant high speed to the constant low speed stages, and that the stage of acceleration more or less progressively increases the speed of the vane from its lowest constant speed to the highest constant speed or that at which it travels during the metering stage.

From the foregoing it is obvious that I have provided a highly efficiently meter of exceedingly simple construction and which will be extremely accurate in operation with a minimum of pressure drop from the inlet to the outlet ports thereof, and while I have shown the preferred construction of my meter and the preferred interconnecting drive mechanism between the vanes thereof, it is to be understood that various changes in its construction may be made by those skilled in the art without departing from the spirit of the invention as defined in the appended claims.

Having thus described my invention, what I claim and desire to secure by Letters Patent is:

1. A rotary meter comprising a casing having an annular metering chamber having an inlet port and an outlet port formed in the peripheral wall thereof in spaced relationship, three vanes mounted in said chamber to traverse the same continuously in one direction, interconnecting means between the vanes causing each vane to operate through a complete cycle composed of a plurality of stages of relatively different speeds, said stages including a metering stage of a constant highest speed commencing just prior to the boundary of the inlet port and continuing to a point beyond the adjacent boundary of the outlet port, a speed deceleration stage commencing at the end of the metering stage and continuing to the other boundary of the outlet port at which point the vane reaches its lowest speed, a constant lowest speed stage commencing at the end of the deceleration stage and continuing until the vane passes the other boundary of the inlet port, and an acceleration stage commencing at the last named point and accelerating the speed of the vane until it reaches the speed of the constant highest speed at the point of commencement of the metering stage, said interconnecting drive means operating said vanes in synchronism.

2. A rotary meter comprising a casing having an annular metering chamber having an inlet port and an outlet port formed in the peripheral wall thereof in spaced relationship, three vanes mounted in said chamber to traverse the same continuously in one direction, interconnecting means between the vanes causing each vane to operate through a complete cycle composed of a plurality of stages of relatively different speeds, said stages including a metering stage of a constant highest speed commencing just prior to the boundary of the inlet port and continuing to a point beyond the adjacent boundary of the outlet port, a speed deceleration stage commencing at the end of the metering stage and continuing to the other boundary of the outlet port at which point the vane reaches its lowest speed, a constant lowest speed stage commencing at the end of the deceleration stage and continuing until the vane passes the other boundary of the inlet port, and an acceleration stage commencing at the last named point and accelerating the speed of the vane until it reaches the speed of the constant highest speed at the point of commencement of the metering stage, said interconnecting drive means operating said vanes in synchronism, the synchronous operation of the vanes and spacing between the inlet and outlet ports relative thereto being such that no relative movement between adjacent vanes occurs except where either the inlet or outlet ports are in communication with the space between said vanes.

3. A rotary meter comprising a casing having an annular metering chamber formed therein having an inlet port and an outlet port formed in the peripheral wall thereof, a plurality of vanes mounted in the metering chamber to traverse the same continuously in one direction, said inlet port commencing at one point in said wall and extending for substantially 97½ degrees in the direction of rotation of the vanes, the outlet port commencing at a point spaced substantially 170 degrees in the direction of rotation of the vanes from the last named terminal of the inlet port and extending to a point substantially 15 degrees short of the point of commencement of the inlet port, each of the said vanes having an imperforate peripheral surface extending through substantially 45 degrees in sliding contact with the peripheral wall of the metering chamber, interconnecting drive means between said vanes causing each vane to operate through a complete cycle of operation composed of four stages of relatively different speeds, each stage commencing and terminating at definite points relative to the inlet and outlet ports, said stages including a metering stage commencing substantially when the advanced edge of the vane reaches the advance edge of the inlet port and continuing until the other edge of the vane passes the adjacent boundary of the outlet port a predetermined amount, a deceleration stage commencing at the end of the metering stage and continuing until the advanced edge of the vane reaches the other boundary of the outlet port, a lowest speed stage commencing at the end of the deceleration stage and continuing until the rear edge of the vane substantially reaches the adjacent boundary of the inlet port, and an acceleration stage commencing at that point and continuing until the advanced edge of the vane substantially reaches the other boundary of the inlet port, said interconnecting drive means so operating the vanes in timed relation that no relative movement between adjacent vanes occurs except when either the inlet or outlet ports are in communication between the space between said vanes.

4. A rotary meter comprising a casing having an annular metering chamber having an inlet port and an outlet port formed in spaced relation in its peripheral wall, a plurality of vanes mounted for rotation in said chamber to traverse the same continuously in one direction, interconnecting drive means between the vanes causing the relative rotational speed of each vane to definitely change at definite points relative to the inlet and outlet ports during each cycle of operation of the vane, said vanes periodically defining, on opposite sides of said ports, chambers closed to said ports, said driving means causing the vanes while defining such chambers to travel at identical speeds, and a volume indicating means driven in accordance with the movement of the vanes.

5. A rotary meter comprising a casing having an annular metering chamber having an inlet port and an outlet port formed in spaced relation in its peripheral wall, said wall defining sealing surfaces between adjacent edges of said ports, a plurality of vanes mounted for rotation in said chamber to traverse the same continuously in one direction and cooperate with said sealing surfaces, interconnecting drive means between the vanes causing the relative rotational speed of each vane to definitely change at definite points relative to the inlet and outlet ports during each cycle of operation of the vane, said interconnecting drive means periodically positioning a pair of said vanes on each of said sealing surfaces, and driving the same when so positioned at identical speeds, and a volume indicating means driven in accordance with the movement of the vanes.

6. A rotary meter comprising a casing having an annular metering chamber having an inlet port and an outlet port in spaced relationship, said chamber defining sealing surfaces between adjacent edges of said ports, a plurality of vanes mounted in said chamber to traverse the same continuously in one direction and cooperate with said sealing surfaces, interconnecting drive means between the vanes causing each vane to operate through a complete cycle composed of a plurality of stages of relatively different rotational speeds, one of said stages being a metering stage and being of a constant speed from at least one boundary of the inlet port to at least the adjacent boundary of the outlet port in the direction of travel of the vanes, said interconnecting drive means between the vanes operating them in timed relationship, the operation of the vanes and spacing between the ports relative thereto being such that a pair of the vanes are periodically positioned on each of said sealing surfaces, and driven at identical speeds when so positioned, and a volume indicating means driven in accordance with the movement of the vanes.

7. A rotary meter comprising a casing having an annular metering chamber having an inlet port and an outlet port in spaced relationship, said chamber defining sealing surfaces between adjacent edges of said ports, a plurality of vanes mounted in said chamber to traverse the same continuously in one direction and cooperate with said sealing surfaces, interconnecting drive means between the vanes causing each vane to operate through a complete cycle composed of a plurality of stages of relatively different rotational speeds, one of said stages being a metering stage and being of a constant speed from at least one boundary of the inlet port along one of said sealing surfaces to at least the adjacent boundary of the outlet port in the direction of travel of the vanes, the succeeding stage being one of deceleration from the termination of the metering stage to a point not beyond the leading edge of the succeeding sealing surface, said interconnecting drive means between the vanes operating them in timed relationship, the operation of the vanes and spacing between the ports relative thereto being such that a pair of the vanes are periodically positioned on each of said sealing surfaces, and driven at identical speeds when so positioned, and a volume indicating means driven in accordance with the movement of the vanes.

8. A rotary meter comprising a casing having an annular metering chamber having an inlet port and an outlet port in spaced relationship, said chamber defining sealing surfaces between adjacent edges of said ports, a plurality of vanes mounted in said chamber to traverse the same continuously in one direction and cooperate with said sealing surfaces, interconnecting drive means between the vanes causing each vane to operate through a complete cycle composed of a plurality of stages of relatively different rotational speeds, one of said stages being a metering stage and being of a constant speed from at least one boundary of the inlet port along one of said sealing surfaces to at least the adjacent boundary of the outlet port in the direction of travel of the vanes, the succeeding stage being one of deceleration from the termination of the metering stage to a point not beyond the leading edge of the succeeding sealing surface, said interconnecting drive means between the vanes operating them in timed relationship, the operation of the vanes and spacing between the ports relative thereto being such that a pair of the vanes are periodically positioned on each of said sealing surfaces, and driven at identical speeds when so positioned, and a succeeding stage in said cycle being one of acceleration from a point beyond the trailing edge of said succeeding sealing surface to a point where it assumes a constant speed for the metering stage, and a volume indicating means driven in accordance with the movement of the vanes.

PAUL RENFREW.